United States Patent [19]

Krude et al.

[11] 4,456,269
[45] Jun. 26, 1984

[54] SEALING BOOT FOR UNIVERSAL JOINT ASSEMBLY

[75] Inventors: Werner Krude, Siegburg-Kaldauen; Karl-Heinz Müller, Wissen; Helmut Riemscheid, Lohmar, all of Fed. Rep. of Germany

[73] Assignee: Uni-Cardan Aktiengesellschaft, Siegburg, Fed. Rep. of Germany

[21] Appl. No.: 426,642

[22] Filed: Sep. 29, 1982

[30] Foreign Application Priority Data

Oct. 13, 1981 [DE] Fed. Rep. of Germany ....... 3140514

[51] Int. Cl.³ .............................................. F16J 15/32
[52] U.S. Cl. .............................. 277/212 FB; 464/175
[58] Field of Search ................. 277/212 FB; 64/32 F; 300/36.1

[56] References Cited

U.S. PATENT DOCUMENTS 4,199,159 4/1980 Evans ........................... 277/212 FB
4,325,587 4/1982 Seigert ........................... 277/212 FB

FOREIGN PATENT DOCUMENTS 2055181 11/1970 Fed. Rep. of Germany .

*Primary Examiner*—Robert I. Smith
*Attorney, Agent, or Firm*—Toren, McGeady and Stanger

[57] ABSTRACT

A sealing boot for connection between an outer member of a universal joint assembly and a shaft member associated with an inner member of the joint, the boot being formed with a first end portion which is connected with the joint outer member and a second end portion which is connected with the shaft member. The first end portion of the boot affords a sealing face which engages an end face of the outer joint member and which extends generally radially relative thereto and an axially extending cylindrical portion which fits over the exterior of the outer joint member in order to connect the first end portion of the boot with the outer joint member. The first end portion of the boot may be formed with external reinforcing ribs and internal inwardly extending projections which act as stops to limit movement of the boot if the joint is over articulated. The second end portion of the boot may be conventionally secured to the shaft member or it may be formed with inwardly extending sealing lips.

1 Claim, 7 Drawing Figures ed,269

SEALING BOOT FOR UNIVERSAL JOINT ASSEMBLY

The present invention relates generally to universal joint assemblies and more particularly to a sealing boot structure for such assemblies.

Sealing boots for universal joints are usually made of elastic material and are formed with a first end adapted to be connected with one member of the universal joint and with a second end adapted to be connected with another member of the universal joint. The first end portion of the sealing boot may be of relatively larger diameter than the second end portion, and the second end portion may be adapted for connection with a shaft member associated with an inner joint member of the joint assembly. The sealing boot provides retention of lubricant and exclusion of dirt from the universal joint assembly while simultaneously accommodating relative articulation and possible relative axial movement between the inner and outer members of the joint assembly.

It is known that the first end portion of a sealing boot may be connected to the outer joint member of the joint assembly by an encircling clip. In such a design, the effectiveness of the sealing function depends upon the tightness of the clip, and the boot may be damaged if the clip is excessively tight.

It has also been proposed in German Offenlegungsschrift No. 2 055 181 to connect the first end portion of the sealing boot with a sheet metal cap which is itself secured to the outer joint member. However, such an approach involves the provision of an additional component besides the boot itself, namely, the sheet metal cap, which must itself be secured to the outer joint member.

Accordingly, the present invention is directed toward the provision of a sealing boot construction for a universal joint assembly which may overcome disadvantages of the prior art and which may provide a simpler structural configuration.

SUMMARY OF THE INVENTION

Briefly, the present invention may be described as a sealing boot made of an elastic material for a universal joint assembly which includes an outer joint member and an inner joint member having a shaft member operatively associated with the inner joint member, said sealing boot comprising a first larger diameter end portion adapted to be connected to said outer joint member and a second end portion having a relatively smaller diameter than said first end portion adapted to be connected to said shaft member, said first larger diameter end portion comprising a radially extending sealing face which is adapted to engage an end face of said outer joint member and an axially extending cylindrical portion adapted to fit over said outer joint member in order to cooperate with said radially extending sealing face to secure said boot to said outer joint member, said first end portion including said radially extending sealing face and said axially extending cylindrical portion being made of the same material as the other parts of said sealing boot.

An advantage of the structure in accordance with the invention is that a sealing boot formed in accordance therewith will be relatively inexpensive to produce and may be fitted or removed without great complications. There arises no need for additional components such as a sheet metal cap and the boot itself, between its first and second end portions, may be of a standard design, e.g., it may be a rolling bellows or a folded or convoluted bellows.

The second or smaller diameter end portion of the boot which is connected with the shaft member may be provided with sealing lips for engaging the shaft member. If such sealing lips are provided, no additional securing means may be necessary at the second end portion of the boot. By suitably shaping the sealing lips, lubricant will be prevented from escaping.

In such a construction, there may be provided at least three sealing lips of which the sealing lip furthest from the universal joint may extend away from the sealing boot and that closest to the joint may extend toward the interior of the boot with an intermediate sealing lip being provided which extends substantially perpendicularly to the axis of rotation of the shaft member.

The first end portion of the sealing boot may be provided with external reinforcing ribs which may extend substantially parallel to the axis of rotation of the outer joint member. Such ribs operate to reinforce the boot in the region thereof which has the sealing face so that the boot need have only a relatively thin wall thickness. Additionally, the ribs may act as impeller means to cause air to circulate around the universal joint and the boot in order to assist cooling. The ribs may be arranged at an angle in order to enhance this effect.

The cylindrical portion of the first end of the sealing boot may be provided with a circumferential inwardly extending projection adapted to engage in a corresponding recess provided on the outside of the outer joint member. With such a construction, no additional fixing means may be required at the first end portion of the sealing boot.

The first end portion of the boot may be provided internally in the region of its sealing face with a radially inwardly extending circumferential projection or a plurality of circumferentially spaced projections. Such projections may serve as stop means to prevent damage to the boot during transport or in the case of large angles of articulation of the joint.

There may be provided a further cylindrical portion of the boot adjacent the sealing face which is designed to undergo elastic deformation if the joint is over articulated.

The shaft member with which the second end portion of the boot cooperates may be provided with a surface coating which will assure favorable sliding properties and enhance sealing.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
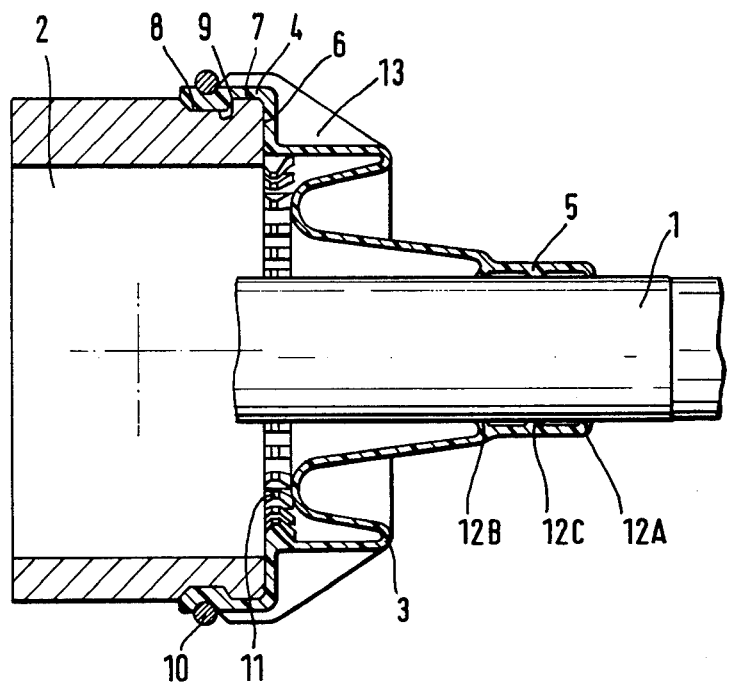
FIG. 1 is a sectional view through an assembly embodying the present invention.

Referring now to FIG. 1 of the drawings, there is illustrated a universal joint assembly in accordance with the present invention which includes a universal joint and drive shaft assembly particularly suitable for motor vehicles. The assembly comprises a shaft member 1 which extends into the interior of an outer member 2 of a constant velocity ratio universal joint. The inner member of the joint and torque transmitting components such as balls or the like have been omitted from FIG. 1 to enhance clarity. The interior of the joint is filled with lubricant which is retained by a sealing boot 3 which is connected between the shaft member 1 and the outer joint member 2.

The sealing boot 3 is made of an elastic material such as a suitable rubber in order to enable the boot to accommodate articulation of the universal joint and possible relative axial movement between the shaft member and the outer joint member thereof. The sealing boot 3 is formed with a first end portion 4 which is a generally larger diameter portion and which is connected to the outer joint member 2. The sealing boot 3 also comprises a second end portion 5 which is a smaller diameter portion and which is connected to the shaft member 1.

The first end portion 4 of the sealing boot 3 provides a radially outwardly extending sealing face 6 which abuts against and seals with a radially extending end face of the outer joint member 2. The sealing face 6 is contiguous with a generally cylindrical portion 7 which fits over the exterior of the outer joint member 2 and which is formed with an inwardly extending annular projection 8 which engages in a recess 9 in the joint member 2.

A circle clip 10 embraces the cylindrical portion 7 of the boot in order to better secure the boot to the outer joint member 2.

At a location radially inwardly of the portion defining the sealing face 6, the boot 3 is provided with a plurality of circumferentially spaced radially inwardly extending projections 11 which may operate as stop means.

At its second, smaller diameter end portion 5, the sealing boot 3 is formed with three sealing lips 12A, 12B, and 12C which extend inwardly to contact the shaft element 1. The sealing lip 12A is the furthest away from the joint and it is oriented so as to face away from the joint thereby to resist penetration of dirt. The innermost sealing lip 12B extends inwardly toward the joint and operates to retain lubricant. The intermediate sealing lip 12C extends substantially perpendicularly to the axis of rotation of the shaft member 1.

The first end portion 4 of the sealing boot 3 is reinforced in the region of its part defining the sealing face 6 by external ribs 13 which extend radially outwardly and axially of the assembly. In addition to reinforcing the boot, the ribs 13 tend to induce air flow over the joint and over the boot during rotation thereby to enhance cooling of the assembly.

Figure 2:
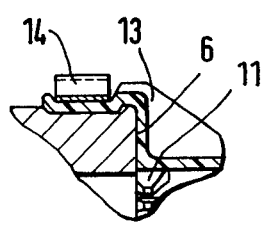
FIGS. 2 and 3 are sectional views showing in greater detail parts of assemblies embodying the present invention.

FIG. 2 shows in greater detail a part of the boot and outer joint member wherein a tensioned circumferential strip 14 is arranged to secure the boot to the outer joint member 2.

Figure 3:
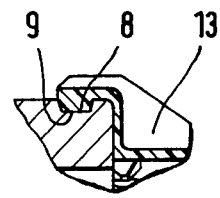

FIG. 3 shows a further embodiment of the invention wherein means which are structurally separate from the boot itself for securing the boot to the other joint member are not utilized and the attachment of the first end portion of the boot to the outer joint member is provided by a snap connection which engages the projections 8 of the boot in the recess 9 of the joint member. The ribs 13 assist in strengthening the boot in this region so that an adequately strong connection may be achieved.

Figure 4:
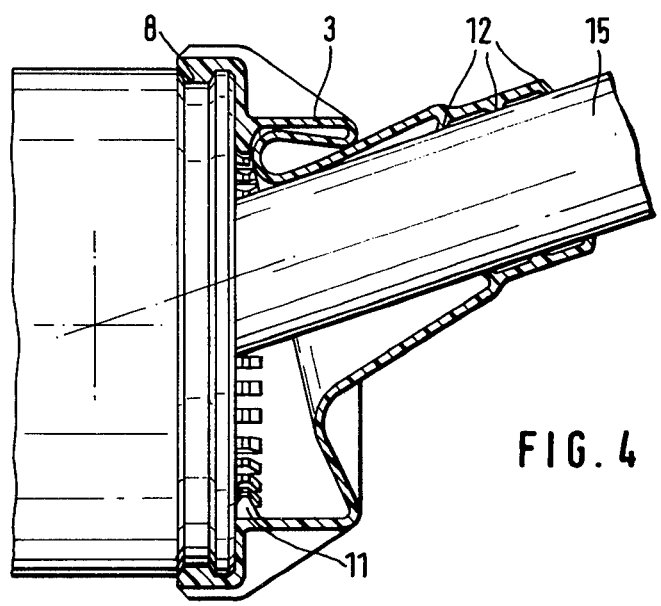
FIG. 4 and 5 are sectional views showing a sealing boot in accordance with the invention when the joint of the assembly is in an articulated condition, with FIG. 5 showing a greater angle of articulation.

FIG. 4 shows the condition of the assembly when the joint is articulated. The sealing boot 3, which is of the rolling bellows type as shown in FIG. 4, is extended on the one side and is tightly folded on the other side. The projections 11 will act as stop means in the sealing boot.

Figure 5:
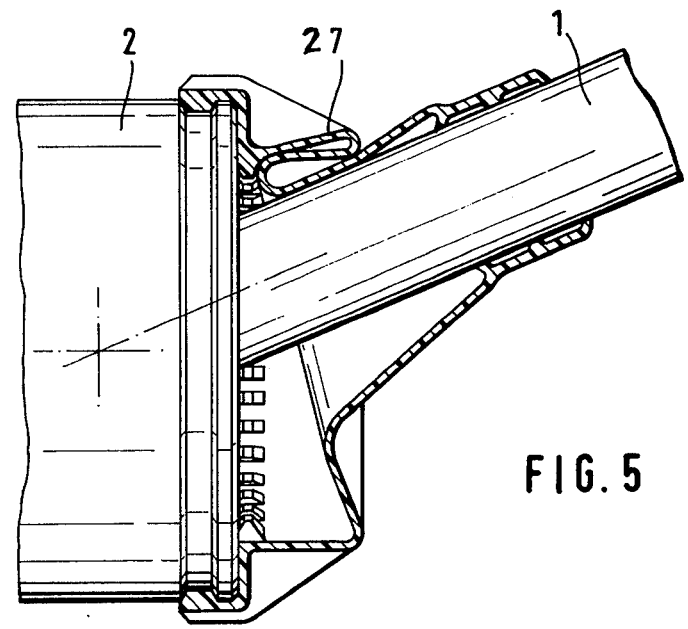

FIG. 5 illustrates the condition when a greater angle of articulation is effected by the joint than that shown in FIG. 4. Deformation of an axially extending cylindrical portion 27 of the boot then occurs.

Figure 6:
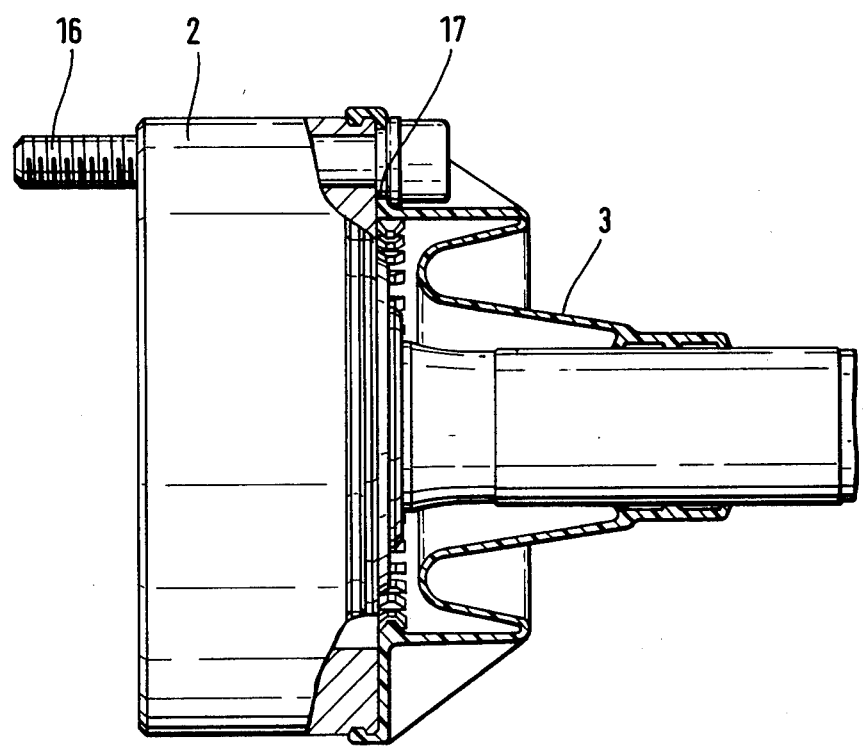
FIG. 6 is a sectional view partially broken away showing a further embodiment of the invention.

FIG. 6 shows a boot in accordance with the invention applied to a different type of universal joint. In the type of universal joint shown in FIG. 6, the joint outer member 2 is a thick disc-like element adapted to be secured by bolts 16 to a flange or the like (not shown). The part of the boot which defines the sealing face 6 is provided with holes 17 through which the bolts 16 extend.

Figure 7:
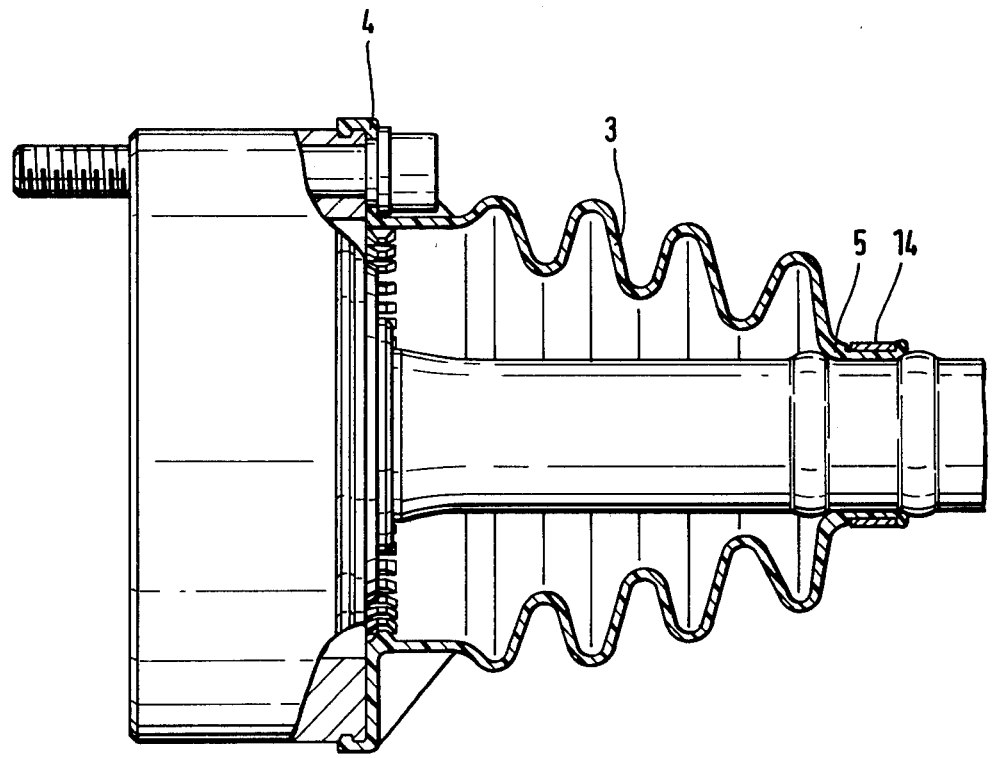
FIG. 7 is a sectional view partially broken away showing a further modification of an assembly in accordance with the invention.

FIG. 7 shows a modification of the assembly of FIG. 6 wherein the second end portion 5 of the boot 3 is conventionally secured to the shaft element by a clamping strip 14 and wherein the end portion 5 is not formed with inwardly extending sealing lips such as the lips 12A–12C. In this case, the boot is in the form of a convoluted bellows instead of a rolling bellows.

In the embodiments shown in FIGS. 1–6, the shaft element 1 may be provided with an external coating to assist sealing and, if necessary, to permit sliding of the end portion 5 of the boot having the sealing lips along the shaft element 1.

While specific elements of the invention have been shown and described in detail to illustrate the application of the inventive principles, it will be understood that the invention may be embodied otherwise without departing from such principles.

What is claimed is:

1. A sealing boot made of elastic material for a universal joint assembly which includes an outer joint member and a shaft member adapted to be operatively associated with an inner joint member of said joint assembly, said sealing boot comprising:

a first larger diameter end portion connected in tight sealed engagement with said outer joint member and a second end portion having a relatively smaller diameter than said first end portion connected in tight sealed engagement to said shaft member;

a bellows portion extending between said first end portion and said second end portion to sealingly enclose said joint assembly;

said first larger diameter end portion comprising
a radially extending sealing face which is adapted to engage an end face of said outer joint member, and
an axially extending cylindrical portion adapted to fit over said outer joint member in order to cooperate with said radially extending sealing face to secure said boot to said outer joint member; and a plurality of ribs arranged on the outside of said sealing boot at said first larger diameter end portion in the vicinity of said axially extending cylindrical portion and said radially extending sealing face;

said ribs being circumferentially spaced about the outer circumference of said sealing boot and to extend radially outwardly substantially parallel to the axis of rotation of said outer joint member;

said ribs acting in the manner of air guide veins and having an elasticity such that they deform together with said bellows portion when said joint is articulated beyond a particular angle of articulation.

* * * * *